UNITED STATES PATENT OFFICE 2,143,490

MANUFACTURE OF CONDENSATION PRODUCTS OF TOTALLY HYDROLIZED PROTEIN MATERIAL AND PRODUCTS THEREOF

Georg Meyer, Cologne-Mulheim, Germany, assignor, by mesne assignments, to General Aniline Works, Inc., New York, N. Y., a corporation of Delaware No Drawing. Application January 11, 1935, Serial No. 1,433. In Germany January 18, 1934

3 Claims. (Cl. 260—9)

This invention relates to the manufacture of valuable condensation products of totally hydrolized protein material for the treatment of textiles, leathers and the like.

I have found that products of high technical value are obtained from mixtures of simple aminocarboxylic acids, such as can be obtained by total hydrolysis of proteins or substances containing the same, by acylating the said mixtures with the radicals of organic acids comprising carboxylic acids, sulfonic acids, sulfaminic acids and acid organic derivatives of carbonic acid.

The aminocarboxylic acid mixtures serving as initial materials for the manufacture of the condensation products may be obtained by complete hydrolysis of natural protein substances or animal or vegetable materials containing the same such, for instance, as albumin, glutin, protein material from wheat, yeast, soy bean flour and the like. The cheap wastes from the tanneries and slaughterhouses and also the wastes of leather, horn, hair and wool may be advantageously employed. The decomposition of the said protein materials may be performed in accordance with known methods, for instance by heating with water, aqueous acids or alkalies. Depending on the nature of the material employed, different mixtures of aminomonocarboxylic acids are obtained such, for instance, as glycocoll, alanin, leucin, prolin, hydroxyprolin, aminodicarboxylic acids such, for instance, as aspartic acid, glutaminic acid and the like, basic aminocarboxylic acids and substitution products thereof, such, for instance, as lysin and arginin. This aminocarboxylic acid mixture may be pre-treated, if desired, with alkylene oxides preferably at raised temperatures before acylating it.

As carboxylic acid radicals there may be cited, for instance, the radicals of the following acids; aliphatic carboxylic acids and substitution products thereof, such as propionic acid, valeric acid, saturated, unsaturated and chlorinated high molecular fatty acids, naphthenic acids, resin acids, cyclohexane carboxylic acid and homologues, analogues and substitution products thereof, dichlorbenzoic acid, naphthoic acid, tetrahydronaphthalene carboxylic acid. As sulfonic acids which can be used for the purpose of the present invention there may be mentioned for instance: butyl sulfonic acid, high molecular, saturated, unsaturated and halogenated aliphatic sulfonic acids, dichlorbenzyl sulfonic acid, diisobutylnaphthalene sulfonic acid and xylene sulfonic acids. The dodecyl methyl sulfaminic acid may be mentioned as an example of a substituted sulfaminic acid.

Radicals of acid organic derivatives of carbonic acid can be introduced into the aminocarboxylic acid mixture by reacting therewith acid esters of carbonic acid. As such esters there may be cited the esters of aliphatic saturated or unsaturated alcohols, for instance ethyl, butyl, octyl, dodecyl, myristyl, cetyl, octodecyl, oleyl alcohol, octodecandiol, montanol, of cycloaliphatic, hydroaromatic, aromatic and aliphatic-aromatic alcohols like, for instance, cyclohexanol, methylcyclohexanol, benzyl alcohol, cinnamic alcohol, phenyl cetyl alcohol, or of a mixture of alcohols such as can be prepared by hydrogenation of oils, fats and waxes.

Another such radical of an organic acid derivative of carbonic acid is the radical of the substituted carbamic acids. It may be introduced into the totally hydrolized protein material by reacting therewith substituted carbamic acids, for instance dodecyl methyl carbamic acid, dicyclohexyl carbamic acid, methyl heptadecyl carbamic acid or substituted isocyanates.

The condensation of the said acids with the aminocarboxylic acid mixture is performed in the usual manner, if desired in the presence of organic solvents as, for example, alcohols or hydrocarbons. Instead of using the free acids, I prefer to employ their reactive derivatives, more especially the acid chlorides derived therefrom. In this case, the reaction is advantageously performed in the presence of alkalies or other indifferent acid-binding substances like pyridin. As acylating agents may then be used carboxylic, sulfonic or sulfaminic acid chlorides, or chlorcarbonic acid esters or the urea chlorides of primary or secondary amines.

The manufacture of these condensation products is very cheap in view of the fact that the cheap wastes of protein-containing substances can be used as starting materials. The new products are particularly distinguished by their good solubility in water; for instance, they are not or only very difficultly to be salted out from their concentrated solutions by the addition of inorganic substances. Moreover, they display a good resisting capacity towards hard water.

Depending on the nature of the group introduced into the aminocarboxylic acid mixture, the products possess a good wetting, washing, emulsifying, equalizing or dispersing effect; therefore, they can be advantageously employed as auxiliary agents in the manufacture and amelioration of fabrics of all kinds, particularly of textiles and leathers. They are particularly suitable as substitutes for or admixtures to soaps in the various processes of the textile industry, especially in all cases in which the sensitiveness of ordinary soaps to salts, for instance of alkaline earths or heavy metals, causes trouble. Such processes are for instance washing, wetting, bucking, bleaching, drumming, dyeing with vat, naphthol, sulfur or azo dyestuffs, after-treating or stripping dyed material, preparing of emulsions of fats, oils, fatty acids, waxes, wax-like substances or paraffin, sizing, impregnating, dressing, finishing and the like. Furthermore, they can be employed for pasting or dissolving dyestuffs or pre-products thereof, for rendering dyed material fast to rubbing, and the like.

In many cases, the new products can be employed in combination with other agents such, for instance, as soaps, turkey red oils, alkylnaphthalene sulfonic acids, condensation products of high molecular carboxylic acids with hydroxy or amino alkyl sulfonic acids, sulfonates of fatty alcohols, glue, starch, soluble gums, mucilages, alcohols, ketones, hydrocarbons, halogenated hydrocarbons and the like.

The following examples illustrate the invention, the parts being by weight:—

Example 1

200 parts of chrome leather wastes are decomposed by means of milk of lime in an autoclave by heating to 140° C. The calcium salts of the resulting aminocarboxylic acid mixture are caused to react with sodium carbonate. After filtration, 110 parts of oleic acid chloride and about 70 parts of commercial concentrated sodium hydroxide solution are added drop by drop to the filtrate during about one hour at 40-45° C. while intensely stirring, the reaction mixture being always kept weakly alkaline. After the whole amount of oleic acid chloride has been added, the reaction mixture is heated for one further hour to 80-90° C. while stirring. The reaction product forms a viscous light-yellow to yellow-brown paste which is readily to be diluted with water to strongly foaming clear solutions of an excellent wetting, washing, dispersing and equalizing power.

Products of similar properties are obtained if soy oil fatty acid chloride, coconut fatty acid chloride or mixtures of these chlorides with oleic acid chloride are employed instead of oleic acid chloride.

By causing the same aminocarboxylic acid mixture to react with stearic acid chloride, products are obtained, which can be advantageously employed, for instance, as softeners for cellulose or regenerated cellulose.

Example 2

200 parts of wastes from glue plates are decomposed by heating with sodium hydroxide solution in an autoclave and drawn off from the impurities separated therefrom. 80 parts of naphthenic acid chloride (prepared from a liquid naphthenic acid mixture of an acid number of about 200) and such a quantity of concentrated sodium hydroxide solution as is necessary to keep the reaction always weakly alkaline are added to the mixture at 40-45° C. while intensely stirring. Thereafter, the reaction mixture is heated for one further hour to 80-90° C. The viscous paste obtained as end product can be readily diluted with water to clear, strongly foaming solutions.

Example 3

75 parts of the chlorcarbonic acid esters of a mixture of alcohols containing 8-18 carbon atoms as is obtainable by catalytic reduction of coconut oil, are introduced drop by drop at about 45-50° C. during one hour while intensely stirring into a solution obtained in accordance with the directions given in Example 1 by decomposition of leather, while keeping the reaction always alkaline by the addition of sodium hydroxide solution. Thereafter, the reaction mixture is heated to 80-90° C. for one further hour. The end product obtained forms a viscous paste which can be diluted with water to clear solutions of a good wetting, washing, dispersing and equalizing effect.

A product of similar properties is obtained by causing the same decomposition mixture to react with the urea chloride obtained from dodecylmethylamine and phosgene.

Example 4

100 kgs. of cotton yarn are dyed in the vat at 60° C. in the usual manner with 0.5 kg. of Indanthrene blue green FFB paste. (Schultz-Julius, Farbstofftabellen, 1932, Vol. II, p. 127.) With the dyeing bath is incorporated 1 g. per liter of the dried condensation product prepared in accordance with the directions given in Example 1. A very homogeneous coloration is obtained.

Example 5

75 kgs. of cotton warps are washed in the dyebeck at 50° C.; the washing bath contains per liter: 2 gs. of sodium carbonate, 2 gs. of soap and 1 g. of the product obtained in accordance with the manner described in Example 3. An excellent washing effect is attained; the material is preserved to a far reaching extent.

I claim:—

1. The products essentially comprising a mixture of aminocarboxylic acids obtainable by totally hydrolizing protein materials, said aminocarboxylic acids being acylated with the radical of a substituted carbamic acid of the formula $R_1R_2N$—CO—OH, in which $R_1$ is a member of the group consisting of hydrogen, aliphatic, cyclo-aliphatic, aromatic, araliphatic and hydro-aromatic radicals, and $R_2$ is a member of the group consisting of aliphatic, cyclo-aliphatic, aromatic, araliphatic and hydro-aromatic radicals.

2. The products essentially comprising a mixture of aminocarboxylic acids obtainable by totally hydrolizing protein materials, said aminocarboxylic acids being acylated with the radical of methyl dodecyl carbamic acid.

3. The process which comprises condensing a mixture of amino-carboxylic acids obtainable by totally hydrolizing protein materials with chlorides of substituted carbamic acids of the formula $R_1R_2N$—CO—Cl, wherein $R_1$ is a member of the group consisting of hydrogen, aliphatic, cyclo-aliphatic, aromatic, araliphatic and hydro-aromatic radicals, and $R_2$ is a member of the group consisting of aliphatic, cyclo-aliphatic, aromatic, araliphatic and hydro-aromatic radicals.

GEORG MEYER.